(12) United States Patent
Wang et al.

(10) Patent No.: US 11,663,404 B2
(45) Date of Patent: May 30, 2023

(54) TEXT RECOGNITION METHOD, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Shuohuan Wang, Beijing (CN); Siyu Ding, Beijing (CN); Yu Sun, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 17/101,789

(22) Filed: Nov. 23, 2020

(65) Prior Publication Data
US 2021/0383064 A1 Dec. 9, 2021

(30) Foreign Application Priority Data
Jun. 3, 2020 (CN) .......................... 202010494419.2

(51) Int. Cl.
*G06F 40/279* (2020.01)
*G06N 20/00* (2019.01)
*G06F 40/166* (2020.01)
*G06F 40/30* (2020.01)

(52) U.S. Cl.
CPC .......... *G06F 40/279* (2020.01); *G06F 40/166* (2020.01); *G06F 40/30* (2020.01); *G06N 20/00* (2019.01)

(58) Field of Classification Search
None
See application file for complete search history.

(56) References Cited

U.S. PATENT DOCUMENTS

2020/0258498 A1* 8/2020 Reisswig ................ G06F 40/30

OTHER PUBLICATIONS

Extended European Search Report for Application No. 20217428.0, dated Jun. 18, 2021, 10 pages.
(Continued)

*Primary Examiner* — Antim G Shah
(74) *Attorney, Agent, or Firm* — Lippes Mathias LLP (57) ABSTRACT

The disclosure provides a text recognition method, an electronic device, and a storage medium. The method includes: obtaining N segments of a sample text; inputting each of the N segments into a preset initial language model in sequence, to obtain first text vector information corresponding to the N segments; inputting each of the N segments into the initial language model in sequence again, to obtain second text vector information corresponding to a currently input segment; in response to determining that the currently input segment has the mask, predicting the mask according to the second text vector information and the first text vector information to obtain a predicted word at a target position corresponding to the mask; training the initial language model according to an original word and the predicted word to generate a long text language model; and recognizing an input text through the long text language model.

12 Claims, 5 Drawing Sheets

(56) References Cited

OTHER PUBLICATIONS

Anonymous Authors, "BERT-AL: BERT For Arbitrarily Long Document Understanding", Under Review as a Conference Paper at ICLR, Dec. 24, 2019, 10 pages.
Jiezhong Qiu et al., "Blockwise Self-Attention for Long Document Understanding", Under Review as a Conference Paper at ICLR 2020, Nov. 7, 2019, 12 pages.
Ming Ding et al., "CogLTX: Applying BERT to Long Texts", 34th Conference on Neural Information Processing Systems (NeurIPS 2020), Vancouver, Canada, Dec. 1, 2020, 13 pages.
Raghavendra Pappagari et al., "Hierarchical Transformers for Long Document Classification", IEEE, Dec. 14, 2019, 7 pages.
Iz Beltagy et al., "Longformer: The Long-Document Transformer", Apr. 10, 2020, 14 pages.
Zihang Dai et al., "Transformer-XL: Attentive Language Models Beyond a Fixed-Length Context", Jun. 2, 2019, 20 pages.

* cited by examiner

Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains. Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains. [CLS]

Text label generation

TEXT RECOGNITION METHOD, ELECTRONIC DEVICE, AND STORAGE MEDIUM

CROSS-REFERENCE TO RELATED APPLICATION

This application claims priority to Chinese Patent Application No. 202010494419.2, filed on Jun. 3, 2020, the entire contents of which are incorporated herein by reference.

TECHNICAL FIELD

The disclosure generally relates to the field of computer technologies, and more particular to the fields of natural language processing and deep learning technologies.

BACKGROUND

Pre-trained models, represented by BERT (Bidirectional Encoder Representations from Transformers), have proposed currently a paradigm of "pre-training plus fine-tuning", which greatly improves effects of various Natural Language Processing (NLP) tasks. The BERT models adopt a deep Transformer model structure and learn context-sensitive representations based on massive unsupervised texts, to solve the various NLP tasks (such as text matching, text generation, sentiment classification, text summarization, question answering, and retrieval) in a general and unified manner.

However, the current mainstream semantic representation model is only applicable to segments within a short length (e.g. 512), and it is difficult to model a text whose entire length is greater than 512, and to recognize and process an ultra-long text information.

SUMMARY

In a first aspect, embodiments of the disclosure provide a text recognition method. The method includes: obtaining N segments of a sample text, in which at least one of the N segments has a mask; inputting each of the N segments into a preset initial language model in sequence, to obtain first text vector information corresponding to the N segments; inputting each of the N segments into the initial language model in sequence again, to obtain second text vector information corresponding to a currently input segment, in which the second text vector information, corresponding to the currently input segment, is different from the first text vector information, and has memory information corresponding to the N segments; in response to determining that the currently input segment has the mask, predicting the mask according to the second text vector information and the first text vector information to obtain a predicted word at a target position corresponding to the mask; training the initial language model according to an original word at the target position and the predicted word to generate a long text language model; and recognizing an input text according to a target task through the long text language model.

In a second aspect, embodiments of the disclosure provide an electronic device. The electronic device includes: at least one processor, and a memory communicatively connected to the at least one processor. The memory stores instructions executable by the at least one processor, and when the instructions are executed by the at least one processor, the at least one processor is caused to implement the method according to the first aspect of the embodiments of the disclosure.

In a third aspect, embodiments of the disclosure provide a computer-readable storage medium storing computer instructions. When the instructions are executed, the at least one processor is caused to implement the method according to the first aspect of the embodiments of the disclosure.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Figure 1:
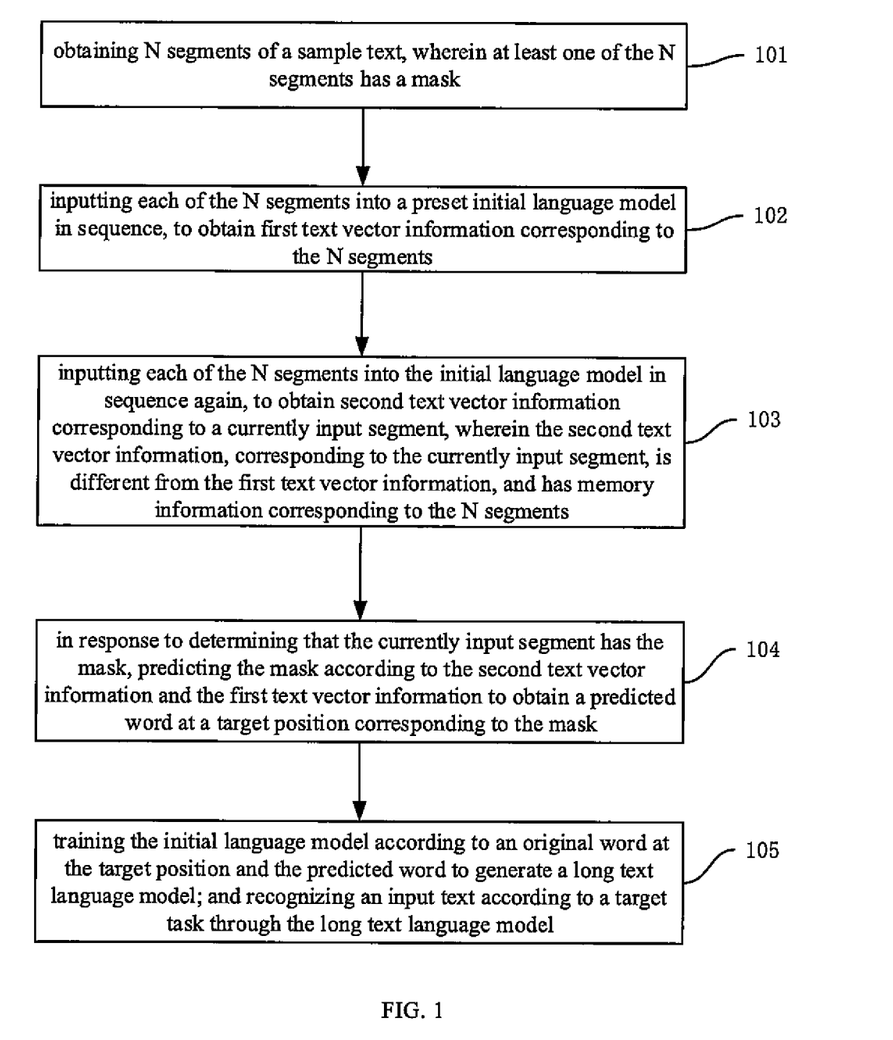
FIG. 1 is a flowchart of a text recognition method according to an embodiment of the disclosure.

FIG. 1 is a flowchart of a text recognition method according to an embodiment of the disclosure. It should be noted that the text recognition method according to the embodiments of the disclosure is applicable to the text recognition apparatus according to the embodiments of the disclosure, and the text recognition apparatus may be configured on an electronic device.

As illustrated in FIG. 1, the text recognition method includes the following.

At block 101, N segments of a sample text are obtained, in which at least one of the N segments has a mask.

In some embodiments, a long text is obtained from a corpus, and original words at different positions of the long text are replaced with masks to obtain a masked long text, and the N segments are obtained by segmenting the masked long text according to a target length.

The length of the long text mentioned above may exceed a certain threshold. For example, the long text may be an entire article, or the length of the long text exceeds 512.

Optionally, after the long text is obtained, entity recognition is performed on the long text to obtain entities in the long text, and original words corresponding to the entities are masked, such that the original words are replaced by the masks. In this way, the masked long text is obtained, and then the masked long text is segmented according to a preset target length to obtain the N segments. The target length may be 512.

For example, for a long Chinese text "四大名著包括《西游记》,《水浒传》,《三国演义》,《红楼梦》, 其在浩瀚如烟的古典小说中 如四座屹立不 倒的高山 (which means that four classic novels of Chinese literature *Journey to the West, Heroes of the Marshes, The Romance of the Three Kingdoms*, and *The Story of Stone*, are like four towering mountains in countless classical novels)", the entity recognition is performed on the long text, and entity words " 西游记 (Chinese characters, which mean *Journey to the West*)" and " 古典 (Chinese characters, which mean classical)" are masked by the masks, such that a masked long Chinese text "四大名著包括《[M][M][M]》, 《水浒传》, 《三国演义》, 《红楼梦》, 其在浩瀚如烟, 的[M][M]小说, 中如四座屹立不倒的高山 (which means that four classic novels of Chinese literature [M][M][M], *Heroes of the Marshes, The Romance of the Three Kingdoms*, and *The Story of Stone*, are like four towering mountains in countless [M][M] novels)" is obtained. Afterwards, the masked long text is segmented according to a length of 512 to obtain three segments, i.e., " 四大名著包括《[M][M][M]》, 《水浒传》, (which means four classic novels of Chinese literature [M][M][M], *Heroes of the Marshes*)" "《三国演义》,《红楼梦》, 其在浩瀚如 (which means *The Romance of the Three Kingdoms*, and *The Story of Stone*)" and " 烟的[M][M]小说 中如四座屹立不倒的高山 (which means that are like four towering mountains in countless [M][M] novels)".

At block 102, each of the N segments is input into a preset initial language model in sequence, to obtain first text vector information corresponding to the N segments.

In this action, after inputting the N segments into the preset initial language model in sequence, the initial language model performs feature extraction on the N segments to obtain the first text vector information corresponding to the N segments.

In some embodiments, the aforementioned initial language model may be a Transformer-XL model. Since the Transformer-XL model adopts Memor7 mechanism to transfer information among segments. That is, when the N segments are input into the Transformer-XL model in sequence, in this process, the Transformer-XL model performs the feature extraction on each of the N segments to obtain the text vector information corresponding to each segment. Furthermore, based on the text vector information corresponding to each segment, the first text vector information corresponding to the N segments are obtained.

At block 103, each of the N segments is input into the initial language model in sequence again, to obtain second text vector information corresponding to a currently input segment, in which the second text vector information, corresponding to the currently input segment, is different from the first text vector information, and has memory information corresponding to the N segments.

That is, after inputting each of the N segments into the preset initial language model in sequence to obtain the first text vector information corresponding to the N segments, each of the N segments is input into the initial language model in sequence again to obtain the second text vector information corresponding to the currently input segment. The second text vector information, corresponding to the currently input segment, is different from the first text vector information, and has memory information corresponding to the N segments.

For example, for the long text "四大名著包括《西游记》,《水浒传》, 《三国演义》, 《红 楼梦》, 其在浩瀚如烟的古典小说中如四 座屹立不倒的高山 (which means that four classic novels of Chinese literature *Journey to the West, Heroes of the Marshes, The Romance of the Three Kingdoms*, and *The Story of Stone*, are like four towering mountains in countless classical novels)", assuming that the segments obtained by segmenting the long text are " 四大名著包括《[M][M][M]》,《水浒传》, (which means four classic novels of Chinese literature [M][M][M], *Heroes of the Marshes*)" "《三国演义》,《红楼梦》, 其在浩瀚如 (which means *The Romance of the Three Kingdoms*, and *The Story of Stone*)" and " 烟的[M][M]小说 中如四座屹立不 倒的高山, (which means that are like four towering mountains in countless [M][M] novels)", in the process of inputting the three segments into the initial Transformer-XL model for the first time, only Memor7 is generated, that is, after obtaining the text vector information corresponding to each segment, the first text vector information corresponding to the three segments is obtained based on the text vector information corresponding to each of the three segments. After that, these three segments are input into the initial Transformer-XL model again, at this time, the Transformer-XL model performs the feature extraction on the currently input segment to obtain the second text vector information corresponding to the currently input segment.

At block 104, in response to determining that the currently input segment has the mask, the mask is predicted according to the second text vector information and the first text vector information to obtain a predicted word at a target position corresponding to the mask.

Optionally, when each of the N segments is input into the initial language model in sequence again, the initial language model needs to determine whether the currently input segment has the mask. In response to determining that the currently input segment has the mask, the mask is predicted to obtain the predicted word at the target position corresponding to the mask. That is, after inputting the N segments to the initial language model for the second time, the initial language model predicts the masks in the N segments input at the second time, and the initial language model is trained and learned based on the prediction results.

That is, in the disclosure, the masked long text is input into the initial language model twice in a loop, in the process of inputting the masked long text into the initial language model for the first time, the first text vector information corresponding to the N segments of the masked long text is generated through the initial language model. At this time, the initial language model does not make predictions and does not return gradients. Only in the process of inputting the masked long text into the initial language model for the second time, the masks in the N segments of the masked long text are predicted through the initial language model, LOSS is returned based on correctness and incorrectness of the prediction of the mask, so as to realize the training and learning of the initial language model.

Therefore, when the N segments are input into the initial language model for the second time, since the first input segment at this time has the text vector information of the previous segment, the previous segment is the N segment input for the first time. At this time, when the N segments are input for the second time, the initial language model starts to train and learn the N segments input for the second time, which effectively improves the model performance, and the effect of NLP tasks.

For example, for the long text "四大名著包括《西游记》, 《水浒传》, 《三国演义》, 《红楼梦》 其在浩瀚如烟的古典小说中如四座屹 立不倒的高山 (which means that four classic novels of Chinese literature *Journey to the West, Heroes of the Marshes, The Romance of the Three Kingdoms*, and *The Story of Stone*, are like four towering mountains in countless classical novels)", it is assumed that the segments obtained by segmenting the long text are "四大名著包 括《[M][M][M]》,《水浒传》 (which means four classic novels of Chinese literature [M][M][M], *Heroes of the Marshes*)", "《三国演义》, 《红楼梦》 其在浩瀚如 (which means *The Romance of the Three Kingdoms*, and *The Story of Stone*)" and " 烟的[M][M]小说 中如四座屹立不 倒的高山, (which means that are like four towering mountains in countless [M][M] novels)". After inputting the three segments into the initial language model for the second time, the first segment "四大名 著包括 《[M][M][M]》,《水浒传》, which means four classic novels of Chinese literature [M][M][M], Heroes of the Marshes)" has the text vector information of the previous three segments, and the previous three segments shown are the first text vector information obtained by inputting the above three segments into the initial language model for the first time. Therefore, when performing the mask prediction on the first segment "四大名著包括,《[M][M][M]》,《水 浒传》, (which means four classic novels of Chinese literature [M][M][M], *Heroes of the Marshes*)", since the segment has the text vector information of the previous segments at this time, the prediction could be well performed, so that the performance of the model is improved through this training method.

At block 105, the initial language model is trained according to an original word at the target position and the predicted word to generate a long text language model, and an input text is recognized according to a target task through the long text language model.

Optionally, after obtaining the predicted word at the target location corresponding to the mask, a corresponding loss value is generated according to the original word and predicted word preset at the target location, and model parameters of the initial language model are adjusted based on the loss value, and the mask is predicted and learned again by using the adjusted model until the model training effect reaches preset requirements. The trained model is the long text language model, which may realize semantic representation of an ultra-long text. It should be noted that in the embodiments of the disclosure, when the initial language model is trained, deep learning is adopted for training. Compared to other machine learning methods, performance of deep learning on the large dataset is better.

Figure 2:
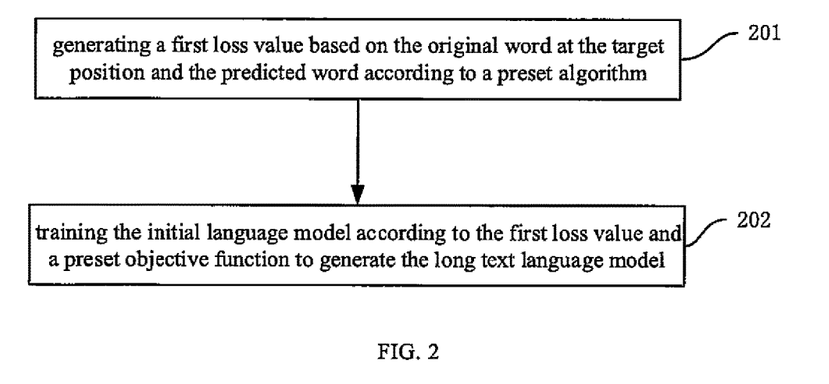
FIG. 2 is a flowchart of a text recognition method according to another embodiment of the disclosure.

In some embodiments, as illustrated in FIG. 2, the specific implementation process of training the initial language model according to the original word at the target position and the predicted word to generate the long text language model is as follows.

At block 201, a first loss value is generated based on the original word at the target position and the predicted word according to a preset algorithm.

In some embodiments, the preset algorithm may be a loss function, and the loss function is used to evaluate a difference degree between the predicted word of the model and the original word.

At block 202, the initial language model is trained according to the first loss value and a preset objective function to generate the long text language model.

The above objective function may be a target loss value. Optionally, after generating the first loss value based on the original word at the target position and the predicted word according to the preset algorithm, it is determined whether there are certain conditions for the first loss value and the objective function, such as whether the first loss value is less than or equal to the target loss value. If it is determined that the first loss value is less than or equal to the target loss value, the training of the model is completed, and the trained model is used as the long text language model. If the first loss value is greater than the target loss value, the training of the model is continued. At this time, the parameters of the model are adjusted, and the adjusted model is applied to predict the mask, and return the loss value based on the correctness and incorrectness of the mask prediction until the loss value is less than or equal to the target loss value, at this time, the training of the model is completed, and the trained model is determined as the long text language model.

Figure 3:
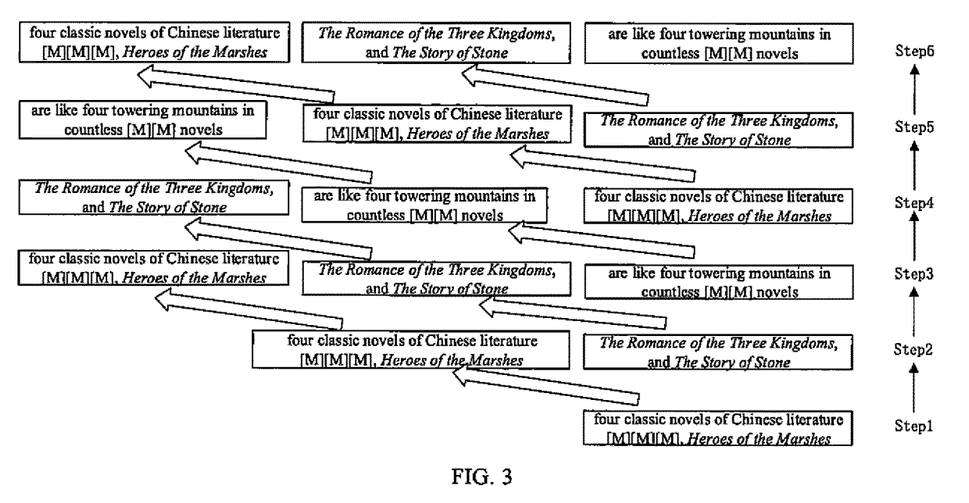
FIG. 3 is an exemplary diagram of modeling a long text according to an embodiment of the disclosure.

In order to facilitate understanding of those skilled in the art, the following description is made in combination with FIG. 3.

For example, for the long text "四大名著包括《西游记》, 《水浒传》, 《三国演义》, 《红楼梦》, 其在浩瀚如烟的 古典小说中如四座 屹立不倒的高山 (which means that four classic novels of Chinese literature *Journey to the West, Heroes of the Marshes, The Romance of the Three Kingdoms*, and *The Story of Stone*, are like four towering mountains in countless classical novels)", it is assumed that the segments obtained by segmenting the long text are " 四大名著包 括《[M][M][M]》,《水浒传》, (which means four classic novels of Chinese literature [M][M][M], *Heroes of the Marshes*)", "《三国演义》, 《红楼梦》, 其在浩瀚如 (which means *The Romance of the Three Kingdoms*, and *The Story of Stone*)" and" 烟的[M][M]小 说中如四座屹立 不倒的高山, (which means that are like four towering mountains in countless [M][M] novels)". As illustrated in FIG. 3, the three segments "four classic novels of Chinese literature [M][M][M], *Heroes of the Marshes*", "*The Romance of the Three Kingdoms*, and *The Story of Stone*" and "are like four towering mountains in countless [M][M] novels" are input into the initial language model in sequence. At the first portion of Step 1 modeling, there are the masks [M] at this time, and the complete text is not seen (i.e., the long text "four classic novels of Chinese literature *Journey to the West, Heroes of the Marshes, The Romance of the Three Kingdoms*, and *The Story of Stone*, are like four towering mountains in countless classical novels" is not fully input into the initial language model at this time), so the learning is not performed. At Step 2, the content extracted at Step 1 is transferred through the Memory mechanism of the Transformer-XL. Step 3 is repeated accordingly. At Step 4, the model detects that the

*Journey to the West* that was masked as [M][M][M] for the second time (i.e., the segment "four classic novels of Chinese literature [M][M][M], *Heroes of the Marshes*" is input into the model for the second time), then the model performs prediction and returns the gradients. Since there is no mask [M] character at Step 5, learning is not performed. At Step 6, the character "classical" masked by [M][M] is learned until this paragraph of text is input into the model for modeling twice. Then the next text is learned. In this way, the pre-training of the long text is realized, and the long text language model is obtained.

After the long text language model is obtained, the corresponding labeled sample corpus are obtained according to the preset target task, and then the long text language model is fine-tuned based on the labeled sample corpus corresponding to the target task to obtain a model for recognizing the target task. In some embodiments, the target tasks may include, but are not limited to, classification tasks, sequence tasks, and generation tasks. The classification tasks may include document classification, semantic matching, question and answer, and other classification tasks. The sequence tasks may include named entity recognition, reading comprehension, and other tasks. The generation tasks may include abstract generation, title generation, dialogue generation, and other tasks.

Figure 4:
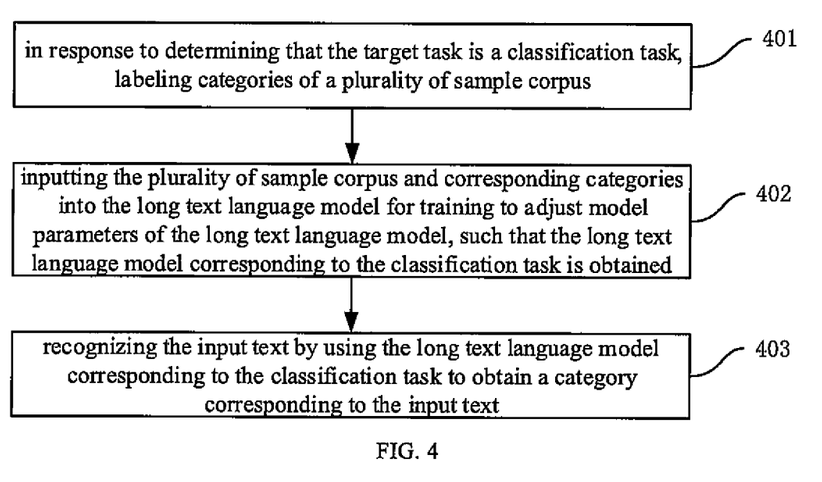
FIG. 4 is a flowchart of a text recognition method according to yet another embodiment of the disclosure.

In some embodiments, as illustrated in FIG. 4, recognizing the input text by using the long text language model corresponding to the task is implemented by the following actions.

At block 401, in response to determining that the target task is a classification task, categories of a plurality of sample corpus are labeled.

That is, if the detected target task is the classification task, it means that the long text language model needs to be fine-tuned to obtain a classification model for the classification task. In order to be able to obtain the classification model for the classification task, at this time, a plurality of sample corpus are obtained, and these sample corpus are classified.

Figure 5:
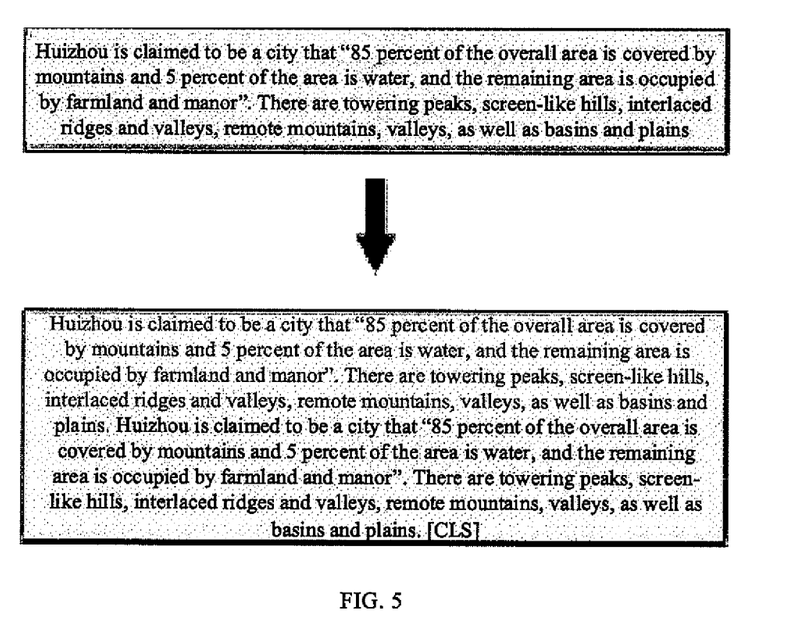
FIG. 5 is an example diagram of inputting a classification task according to an embodiment of the disclosure.

It should be noted that in the embodiments of the disclosure, the above-mentioned sample corpus may include a first corpus and a second corpus, the first corpus and the second corpus have the same text content, and when labeling the categories of the sample corpus, it is necessary to labeling the categories after the second corpus. For example, take the sample corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains. Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains]. When labeling the corpus, a CLS bit prediction category could be added after the second corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains]. That is, a symbol [CLS] is added to the end of the sample corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains. Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains], to determine an output vector corresponding to the symbol as the semantic representation of the entire text for text classification. For example, as illustrated in FIG. 5, the corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains] is input twice into the long text language model, and when the corpus is input for the second time, [CLS] is added to the end of the second corpus.

At block 402, the plurality of sample corpus and corresponding categories are input into the long text language model for training to adjust model parameters of the long text language model, such that the long text language model corresponding to the classification task is obtained.

Optionally, the plurality of sample corpus are input into the long text language model for prediction to obtain predicted categories corresponding to the plurality of the sample corpus, and the corresponding loss values are generated according to the predicted categories and the labeled categories, and the model parameters of the long text language model are adjusted according to the loss values, and the category prediction is performed on the sample corpus again according to the adjusted long text language model, so as to realize the model training of the long text language model for the classification task. Thus, a long text language model suitable for the classification task is obtained.

At block 403, the input text is recognized by using the long text language model corresponding to the classification task to obtain a category corresponding to the input text.

Figure 6:
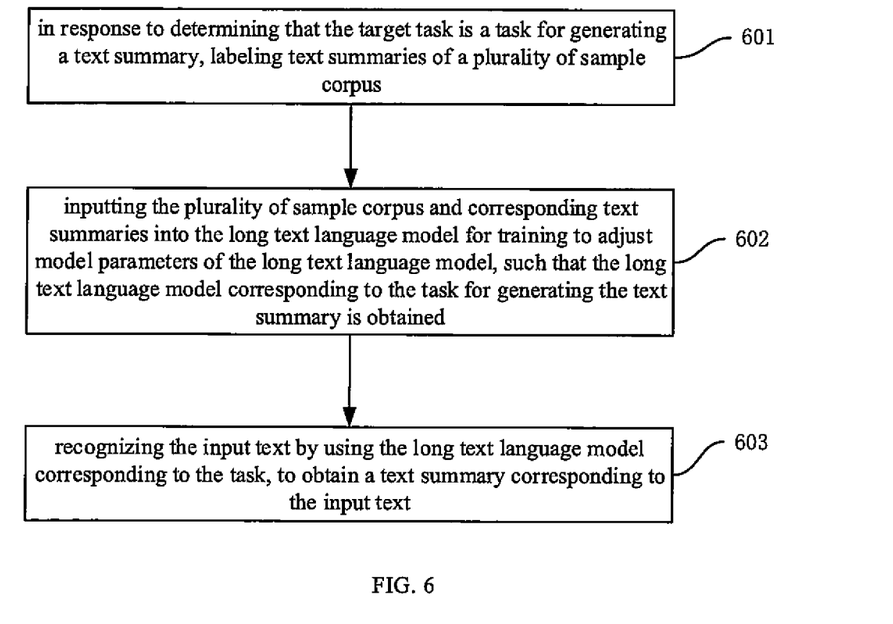
FIG. 6 is a flowchart of a text recognition method according to an embodiment of the disclosure.

In some embodiments, as illustrated in FIG. 6, the specific process of recognizing the input text according to the target task through the long text language model may include the following actions.

At block 601, in response to determining that the target task is a task for generating a text summary, text summaries of a plurality of sample corpus are labeled.

That is, if the target task is a task for generating a text summary, it means that the long text language model needs to be fine-tuned to obtain a model for generating a text summary for the task for generating the text summary. In order to obtain the model for generating the text summary for the task for generating the text summary, a plurality of sample corpus are obtained at this time, and these sample corpus are labeled with summary text. It is understood that the goal of this task for generating the text summary is to generate a text B based on a paragraph of a text A.

Figure 7:
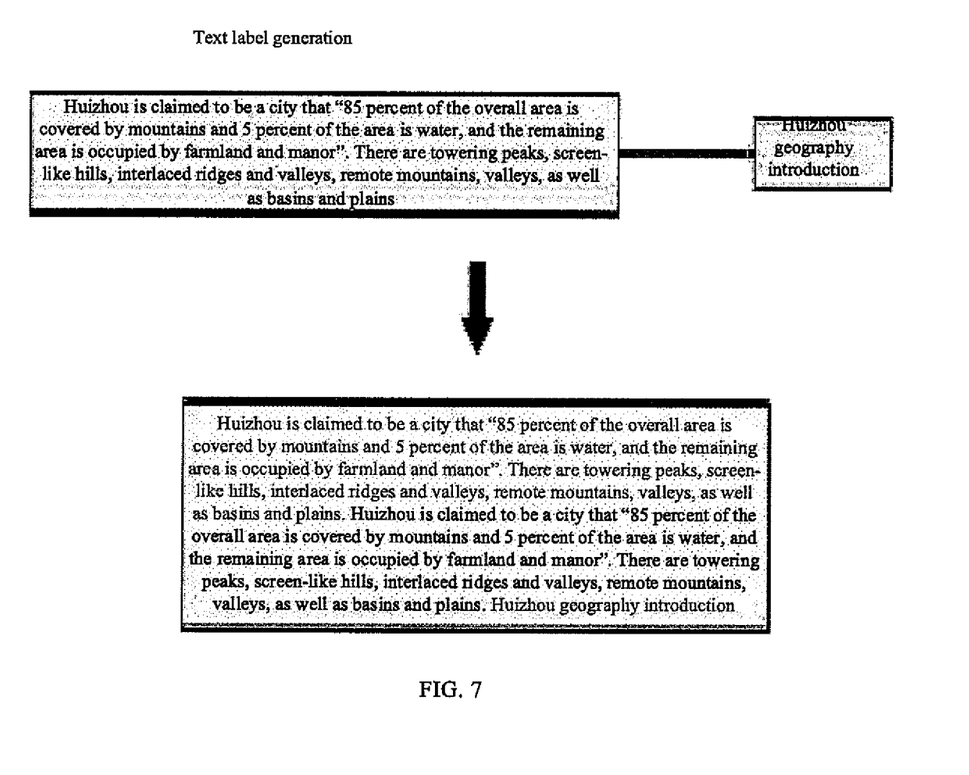
FIG. 7 is a diagram of inputting a task for generating a text summary according to an embodiment of the disclosure.

It should be noted that, in the embodiments of the disclosure, the above-mentioned sample corpus may include the first corpus and the second corpus, the first corpus and the second corpus have the same text content, and when performing the labeling of the summary text on the sample corpus, the summary text is labeled after the second corpus. For example, take the sample corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains. Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains] as an example. It is seen that the sample corpus includes the same corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains], when labeling the summary text of the sample corpus, a summary text (such as Huizhou geography introduction) is labeled after the second corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains], that is, the summary text of "Huizhou geography introduction" is added to the end of the sample corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains. Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains] for generating the summary text. For example, as illustrated in FIG. 7, the corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains] is input twice into the long text language model, when the corpus is input for the second time, the summary text of "Huizhou geography introduction" is added to the end of the second corpus.

At block 602, the plurality of sample corpus and corresponding text summaries are input into the long text language model for training to adjust model parameters of the long text language model, such that the long text language model corresponding to the task for generating the text summary is obtained.

Optionally, the plurality of the sample corpus are input into the long text language model for prediction to obtain the predicted values corresponding to the sample corpus, and generate the corresponding loss values according to the predicted values and real summary labels, and the model parameters of the long text language model are adjusted according to the loss values, so as to realize the model training of the long text language model for the task of generating the text summary and to obtain the long text language model applicable for the task of generating the text summary.

At block 603, the input text is recognized by using the long text language model corresponding to the task, to obtain a text summary corresponding to the input text.

That is, when the long text language model is used to train a model suitable for the target task, the training corpus used needs to be input into the long text language model twice in a loop. When the corpus is input to the long text language model for the second time, the corpus input at the second time is labeled, and then the long text language model is fine-tuned based on the corpus input twice, so as to obtain the model for the target task. For example, for the classification task, special CLS bit prediction categories are used to predict the category when the corpus is input for the second time. For the sequence tasks, N-dimensional Softmax operations are performed on all the text input for the second time, and serialized label of each Token is performed. For a generation task, the goal is to generate the text B based on the paragraph of the text A. Different from traditional language model or Seq2Seq (a cyclic neural network) method, the disclosure performs prediction after inputting the text for the second time. For example, as illustrated in FIG. 7, the text content of the corpus [Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains. Huizhou is claimed to be a city that "85 percent of the overall area is covered by mountains and 5 percent of the area is water, and the remaining area is occupied by farmland and manor". There are towering peaks, screen-like hills, interlaced ridges and valleys, remote mountains, valleys, as well as basins and plains] is input normally, the text content of "Huizhou geography introduction" generated word by word through the Seq2Seq technique is trained and predicted.

It should be noted that the disclosure uses Transformer-XL as the basic skeleton of the model. Meanwhile, in the disclosure, Transformer-XL is used as the basic structure in the process of obtaining the long text language model through pre-training the initial language model, and fine-tuning the long text language model, instead of degenerating into Transformer. In the prior art, the XLNet model degenerates into Transformer during the fine-tuning process, and the model could not process the long text information at this time. In the disclosure, Transformer-XL is still used in the fine-tuning stage, so that the problem of the long text could still be solved after fine-tuning.

According to the text recognition method according to the embodiments of the disclosure, N segments of a sample text are obtained, in which at least one of the N segments has a mask. Each of the N segments is input into a preset initial language model in sequence, to obtain first text vector information corresponding to the N segments. Each of the N segments is input into the initial language model in sequence again, to obtain second text vector information corresponding to a currently input segment, in which the second text vector information, corresponding to the currently input segment, is different from the first text vector information, and has memory information corresponding to the N segments. In response to determining that the currently input segment has the mask, the mask is predicted according to the second text vector information and the first text vector information to obtain a predicted word at a target position corresponding to the mask. The initial language model is trained according to an original word at the target position and the predicted word to generate a long text language model. An input text is recognized according to a target task through the long text language model. Therefore, the disclosure inputs the corpus text into the model cyclically (that is, input the text twice into the model), and when the text is input into the model for the first time, only text vectors of the segments in the text are generated. At this time, the mask is not predicted and learned. When the corpus text is input into the model for the second time, since the text vector information of the segments input at the first time are obtained at this time, the mask is predicted by the model based on the text vector information corresponding to the segments input at the first time, and the segments currently input at the second time. The training of the model is realized by returning gradients based on correctness and incorrectness of the prediction of the mask, so that the trained model is enabled to handle texts with a length beyond 512.

In addition, since the disclosure adopts the segment modeling mode, for a text with a length within 512, modeling could be realized rapidly, and modeling speed is improved. Since the corpus text is input twice in a loop, context information is obtained for each segment, which improves performance of the trained model, makes the performance of the trained model better, and effectively improves effects of the NLP tasks.

In addition, in the disclosure, when the initial language model is trained by using the segments, deep learning is adopted for training. Compared to other machine learning methods, deep learning has a better performance on the large dataset.

In order to implement the above embodiments, the disclosure provides a text recognition apparatus.

Figure 8:
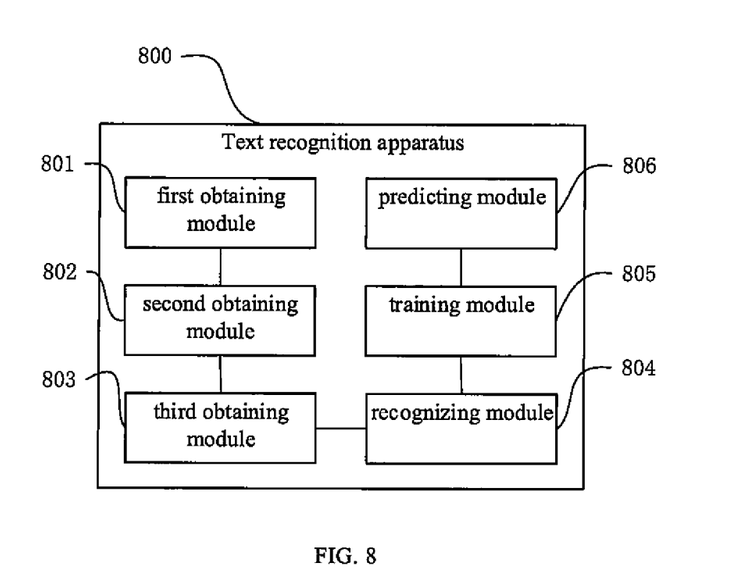
FIG. 8 is a block diagram of a text recognition apparatus according to an embodiment of the disclosure.

FIG. 8 is a block diagram of a text recognition apparatus according to an embodiment of the disclosure. As illustrated in FIG. 8, the text recognition apparatus 800 may include: a first obtaining module 801, a second obtaining module 802, a third obtaining module 803, a predicting module 804, a training module 805 and a recognizing module 806.

The first obtaining module 801 is configured to obtain N segments of a sample text, in which at least one of the N segments has a mask. In some embodiments, the sample text includes a long text, the first obtaining module 801 is configured to: replace original words at different positions of the long text with masks to obtain a masked long text; and obtain the N segments by segmenting the masked long text according to a target length.

The second obtaining module 802 is configured to input each of the N segments into a preset initial language model in sequence, to obtain first text vector information corresponding to the N segments.

The third obtaining module 803 is configured to input each of the N segments into the initial language model in sequence again, to obtain second text vector information corresponding to a currently input segment, in which the second text vector information, corresponding to the currently input segment, is different from the first text vector information, and has memory information corresponding to the N segments.

The predicting module 804 is configured to, in response to determining that the currently input segment has the mask, predict the mask according to the second text vector information and the first text vector information to obtain a predicted word at a target position corresponding to the mask.

The training module 805 is configured to train the initial language model according to an original word at the target position and the predicted word to generate a long text language model. In some embodiments, the training module 805 is specifically configured to: generate a first loss value based on the original word at the target position and the predicted word according to a preset algorithm; and train the initial language model according to the first loss value and a preset objective function to generate the long text language model.

The recognizing module 806 is configured to recognize an input text according to a target task through the long text language model. In some embodiments, the recognizing module 806 is specifically configured to: in response to determining that the target task is a classification task, label categories of a plurality of sample corpus; input the plurality of sample corpus and corresponding categories into the long text language model for training to adjust model parameters of the long text language model, such that the long text language model corresponding to the classification task is obtained; and recognize the input text by using the long text language model corresponding to the classification task to obtain a category corresponding to the input text.

In some embodiments, the recognizing module 806 is specifically configured to: in response to determining that the target task is a task for generating a text summary, label text summaries of a plurality of sample corpus; input the plurality of sample corpus and corresponding text summaries into the long text language model for training to adjust model parameters of the long text language model, such that the long text language model corresponding to the task for generating the text summary is obtained; and recognize the input text by using the long text language model corresponding to the task, to obtain a text summary corresponding to the input text.

With the text recognition apparatus according to the embodiments of the disclosure, N segments of a sample text are obtained, in which at least one of the N segments has a mask. Each of the N segments is input into a preset initial language model in sequence, to obtain first text vector information corresponding to the N segments. Each of the N segments is input into the initial language model in sequence again, to obtain second text vector information corresponding to a currently input segment, in which the second text vector information, corresponding to the currently input segment, is different from the first text vector information, and has memory information corresponding to the N segments. In response to determining that the currently input segment has the mask, the mask is predicted according to the second text vector information and the first text vector information to obtain a predicted word at a target position corresponding to the mask. The initial language model is trained according to an original word at the target position and the predicted word to generate a long text language model. An input text is recognized according to a target task through the long text language model. Therefore, the disclosure inputs the corpus text into the model cyclically (that is, input the text twice into the model), and when the text is input into the model for the first time, only text vectors of the segments in the text are generated. At this time, the mask is not predicted and learned. When the corpus text is input into the model for the second time, since the text vector information of the segments input at the first time are obtained at this time, the mask is predicted by the model based on the text vector information corresponding to the segments input at the first time, and the segments currently input at the second time. The training of the model is realized by returning gradients based on correctness and incorrectness of the prediction of the mask, so that the trained model is enabled to handle texts with a length beyond 512. In addition, since the disclosure adopts the segment modeling mode, for a text with a length within 512, modeling could be realized rapidly, and modeling speed is improved. Since the corpus text is input twice in a loop, context information is obtained for each segment, which improves performance of the trained model, makes the performance of the trained model better, and effectively improves effects of the NLP tasks. In addition, in the disclosure, when the initial language model is trained by using the segments, deep learning is adopted for training. Compared to other machine learning methods, deep learning has a better performance on the large dataset.

According to the embodiments of the disclosure, the disclosure also provides an electronic device and a readable storage medium.

Figure 9:
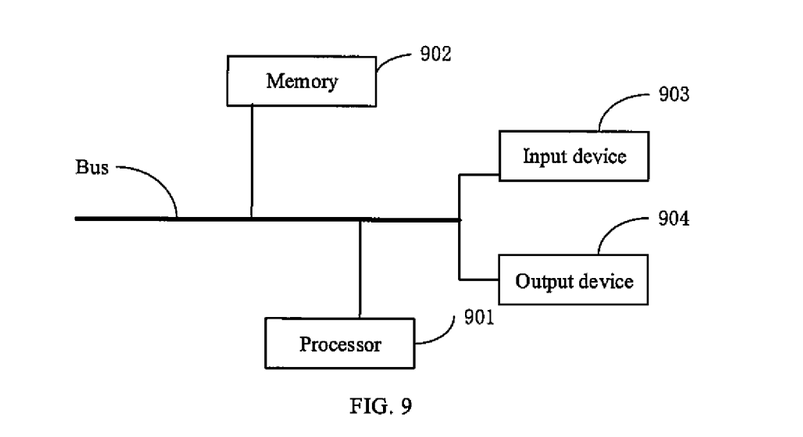
FIG. 9 is a block diagram of an electronic device used to implement a text recognition method according to an embodiment of the disclosure.

FIG. 9 is a block diagram of an electronic device used to implement a text recognition method according to an embodiment of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the electronic device includes: one or more processors 901, a memory 902, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 901 is taken as an example in FIG. 9.

The memory 902 is a non-transitory computer-readable storage medium according to the disclosure. The memory stores instructions executable by at least one processor, so that the at least one processor executes the text recognition method according to the disclosure. The non-transitory computer-readable storage medium of the disclosure stores computer instructions, which are used to cause a computer to execute the text recognition method according to the disclosure.

As a non-transitory computer-readable storage medium, the memory 902 is configured to store non-transitory software programs, non-transitory computer executable programs and modules, such as program instructions/modules corresponding to the text recognition method in the embodiment of the disclosure (For example, the first obtaining module 801, the second obtaining module 802, the third obtaining module 803, the predicting module 804, the training module 805 and the recognizing module 806 shown in FIG. 8). The processor 901 executes various functional applications and data processing of the server by running non-transitory software programs, instructions, and modules stored in the memory 902, that is, implementing the text recognition method in the foregoing method embodiments.

The memory 902 may include a storage program area and a storage data area, where the storage program area may store an operating system and application programs required for at least one function. The storage data area may store data created according to the use of the electronic device for implementing the text recognition method. In addition, the memory 502 may include a high-speed random-access memory, and a non-transitory memory, such as at least one magnetic disk storage device, a flash memory device, or other non-transitory solid-state storage device. In some embodiments, the memory 502 may optionally include a memory remotely disposed with respect to the processor 901, and these remote memories may be connected to the electronic device for implementing the text recognition method through a network. Examples of the above network include, but are not limited to, the Internet, an intranet, a local area network, a mobile communication network, and combinations thereof.

The electronic device for implementing the text recognition method may further include: an input device 903 and an output device 904. The processor 901, the memory 902, the input device 903, and the output device 904 may be connected through a bus or in other manners. In FIG. 9, the connection through the bus is taken as an example.

The input device 903 may receive inputted numeric or character information, and generate key signal inputs related to user settings and function control of an electronic device for implementing the text recognition method, such as a touch screen, a keypad, a mouse, a trackpad, a touchpad, an indication rod, one or more mouse buttons, trackballs, joysticks and other input devices. The output device 904 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the embodiments of the disclosure, the corpus text is input into the model cyclically (that is, input the text twice into the model), and when the text is input into the model for the first time, only text vectors of the segments in the text are generated. At this time, the mask is not predicted and learned. When the corpus text is input into the model for the second time, since the text vector information of the segments input at the first time are obtained at this time, the mask is predicted by the model based on the text vector information corresponding to the segments input at the first time, and the segments currently input at the second time. The training of the model is realized by returning gradients based on correctness and incorrectness of the prediction of the mask, so that the trained model is enabled to handle texts with a length beyond 512. Since the disclosure adopts the segment modeling mode, for a text with a length within 512, modeling could be realized rapidly, and modeling speed is improved. Since the corpus text is input twice in a loop, context information is obtained for each segment, which improves performance of the trained model, makes the performance of the trained model better, and effectively improves effects of the NLP tasks.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A text recognition method, comprising:
    obtaining N segments of a sample text, wherein at least one of the N segments has a mask;
    inputting each of the N segments into an initial language model in sequence, to obtain first text vector information corresponding to the N segments, wherein the initial language model is a language model that transfers information among segments;
    inputting each of the N segments into the initial language model in sequence again, to obtain second text vector information corresponding to a currently input segment, wherein the second text vector information, corresponding to the currently input segment, is different from the first text vector information, and has memory information corresponding to the N segments;
    in response to determining that the currently input segment has the mask, predicting the mask according to the second text vector information and the first text vector information to obtain a predicted word at a target position corresponding to the mask;
    training the initial language model according to an original word at the target position and the predicted word to generate a long text language model; and
    recognizing an input text according to a target task through the long text language model;
    wherein recognizing the input text according to the target task through the long text language model comprises:
    in response to determining that the target task is a classification task, labeling categories of a plurality of sample corpus;
    inputting the plurality of sample corpus and corresponding categories into the long text language model for training to adjust model parameters of the long text language model, such that the long text language model corresponding to the classification task is obtained; and
    recognizing the input text by using the long text language model corresponding to the classification task to obtain a category corresponding to the input text.

2. The method according to claim 1, wherein,
    the sample text comprises a long text,
    obtaining the N segments comprises:
    replacing original words at different positions of the long text with masks to obtain a masked long text; and
    obtaining the N segments by segmenting the masked long text according to a target length.

3. The method according to claim 1, wherein training the initial language model according to the original word at the target position and the predicted word to generate the long text language model, comprises:
    generating a first loss value based on the original word at the target position and the predicted word according to a preset algorithm; and
    training the initial language model according to the first loss value and a preset objective function to generate the long text language model.

4. The method according to claim 1, wherein recognizing the input text according to the target task through the long text language model comprises:
- in response to determining that the target task is a task for generating a text summary, labeling text summaries of a plurality of sample corpus;
- inputting the plurality of sample corpus and corresponding text summaries into the long text language model for training to adjust model parameters of the long text language model, such that the long text language model corresponding to the task for generating the text summary is obtained; and
- recognizing the input text by using the long text language model corresponding to the task, to obtain a text summary corresponding to the input text.

5. An electronic device, comprising:
- at least one processor; and
- a memory connected in communication with the at least one processor; wherein,
- the memory stores instructions executable by the at least one processor, when the instructions are executed by the at least one processor, the at least one processor is caused to implement a text recognition method, the method comprising:
- obtaining N segments of a sample text, wherein at least one of the N segments has a mask;
- inputting each of the N segments into an initial language model in sequence, to obtain first text vector information corresponding to the N segments, wherein the initial language model is a language model that transfers information among segments;
- inputting each of the N segments into the initial language model in sequence again, to obtain second text vector information corresponding to a currently input segment, wherein the second text vector information, corresponding to the currently input segment, is different from the first text vector information, and has memory information corresponding to the N segments;
- in response to determining that the currently input segment has the mask, predicting the mask according to the second text vector information and the first text vector information to obtain a predicted word at a target position corresponding to the mask;
- training the initial language model according to an original word at the target position and the predicted word to generate a long text language model; and
- recognizing an input text according to a target task through the long text language model;
- wherein recognizing the input text according to the target task through the long text language model comprises:
- in response to determining that the target task is a classification task, labeling categories of a plurality of sample corpus,
- inputting the plurality of sample corpus and corresponding categories into the long text language model for training to adjust model parameters of the long text language model, such that the long text language model corresponding to the classification task is obtained; and
- recognizing the input text by using the long text language model corresponding to the classification task to obtain a category corresponding to the input text.

6. The electronic device according to claim 5, wherein, the sample text comprises a long text,
obtaining the N segments comprises:
- replacing original words at different positions of the long text with masks to obtain a masked long text; and
- obtaining the N segments by segmenting the masked long text according to a target length.

7. The electronic device according to claim 5, wherein training the initial language model according to the original word at the target position and the predicted word to generate the long text language model, comprises:
- generating a first loss value based on the original word at the target position and the predicted word according to a preset algorithm; and
- training the initial language model according to the first loss value and a preset objective function to generate the long text language model.

8. The electronic device according to claim 5, wherein recognizing the input text according to the target task through the long text language model comprises:
- in response to determining that the target task is a task for generating a text summary, labeling text summaries of a plurality of sample corpus;
- inputting the plurality of sample corpus and corresponding text summaries into the long text language model for training to adjust model parameters of the long text language model, such that the long text language model corresponding to the task for generating the text summary is obtained; and
- recognizing the input text by using the long text language model corresponding to the task, to obtain a text summary corresponding to the input text.

9. A non-transitory computer-readable storage medium storing computer instructions, wherein when the computer instructions are executed, the computer is caused to implement a text recognition method, the method comprising:
- obtaining N segments of a sample text, wherein at least one of the N segments has a mask;
- inputting each of the N segments into an initial language model in sequence, to obtain first text vector information corresponding to the N segments, wherein the initial language model is a language model that transfers information among segments;
- inputting each of the N segments into the initial language model in sequence again, to obtain second text vector information corresponding to a currently input segment, wherein the second text vector information, corresponding to the currently input segment, is different from the first text vector information, and has memory information corresponding to the N segments;
- in response to determining that the currently input segment has the mask, predicting the mask according to the second text vector information and the first text vector information to obtain a predicted word at a target position corresponding to the mask;
- training the initial language model according to an original word at the target position and the predicted word to generate a long text language model; and
- recognizing an input text according to a target task through the long text language model;
- wherein recognizing the input text according to the target task through the long text language model comprises:
- in response to determining that the target task is a classification task, labeling categories of a plurality of sample corpus;
- inputting the plurality of sample corpus and corresponding categories into the long text language model for training to adjust model parameters of the long text language model, such that the long text language model corresponding to the classification task is obtained; and recognizing the input text by using the long text language model corresponding to the classification task to obtain a category corresponding to the input text.

10. The non-transitory computer-readable storage medium according to claim 9, wherein, the sample text comprises a long text, obtaining the N segments comprises:

replacing original words at different positions of the long text with masks to obtain a masked long text; and obtaining the N segments by segmenting the masked long text according to a target length.

11. The non-transitory computer-readable storage medium according to claim 9, wherein training the initial language model according to the original word at the target position and the predicted word to generate the long text language model, comprises:

generating a first loss value based on the original word at the target position and the predicted word according to a preset algorithm; and training the initial language model according to the first loss value and a preset objective function to generate the long text language model.

12. The non-transitory computer-readable storage medium according to claim 9, wherein recognizing the input text according to the target task through the long text language model comprises:

in response to determining that the target task is a task for generating a text summary, labeling text summaries of a plurality of sample corpus;

inputting the plurality of sample corpus and corresponding text summaries into the long text language model for training to adjust model parameters of the long text language model, such that the long text language model corresponding to the task for generating the text summary is obtained; and recognizing the input text by using the long text language model corresponding to the task, to obtain a text summary corresponding to the input text.

\* \* \* \* \*